United States Patent [19]

Taylor et al.

[11] Patent Number: 5,165,946

[45] Date of Patent: Nov. 24, 1992

[54] ANIMAL FEED ADDITIVE AND METHOD FOR INACTIVATING MYCOTOXINS PRESENT IN ANIMAL FEEDS

[75] Inventors: Dennis R. Taylor, Houston, Tex.; Keith A. Delaney, Hudson, Ohio; Timothy D. Phillips, College Station, Tex.

[73] Assignees: Engelhard Corporation, Iselin, N.J.; Texas A&M University System, Tex.

[21] Appl. No.: 552,715

[22] Filed: Jul. 6, 1990

Related U.S. Application Data

[63] Continuation-in-part of Ser. No. 490,013, Mar. 7, 1990, abandoned.

[51] Int. Cl.$^5$ ............................................. A23K 1/00
[52] U.S. Cl. .................................... 426/74; 426/96; 426/271; 426/302; 426/623; 426/630; 426/807
[58] Field of Search ................ 426/2, 96, 74, 623, 426/630, 636, 807, 302, 310, 271

[56] References Cited

U.S. PATENT DOCUMENTS

| | | | |
|---|---|---|---|
| 1,867,063 | 7/1932 | Dawe | |
| 2,040,811 | 5/1936 | Nitkitin | 167/16 |
| 2,162,609 | 6/1939 | Dawe | 99/4 |
| 2,739,063 | 3/1956 | Wehrmeister | 99/2 |
| 2,970,912 | 2/1961 | Gebrt | 99/2 |
| 2,991,170 | 7/1961 | Szepesi | 71/61 |
| 3,687,680 | 8/1972 | Krchnavi | 99/4 |
| 3,689,275 | 9/1972 | Espoy | 99/2 |
| 3,794,740 | 2/1974 | Achorn | 2/74 |
| 3,798,323 | 3/1974 | Leary | 424/212 |
| 3,836,676 | 9/1974 | Komakine | 426/74 |
| 3,890,452 | 6/1975 | Brandt et al. | 426/321 |
| 3,901,976 | 8/1975 | Grayson | 73/134 |
| 3,966,127 | 6/1976 | Pythewski | 241/73 |
| 4,016,296 | 4/1977 | DeSantis | 426/69 |
| 4,035,518 | 7/1977 | Carmona et al. | 426/23 |
| 4,054,515 | 10/1977 | Sawyer | 210/27 |
| 4,055,667 | 10/1977 | Liston | 426/62 |
| 4,082,677 | 4/1978 | Zollar | 252/815 |
| 4,116,825 | 9/1978 | Sawyer | 210/27 |
| 4,126,701 | 11/1978 | Taylor | 424/329 |
| 4,138,498 | 2/1979 | Das | 426/2 |
| 4,140,649 | 2/1979 | Bossert et al. | 426/271 |
| 4,171,379 | 10/1979 | Harmon | 426/2 |
| 4,171,386 | 10/1979 | Skoch | 426/658 |
| 4,265,916 | 5/1981 | Skoch | 426/74 |
| 4,267,197 | 5/1981 | Sawhill | 426/69 |
| 4,308,293 | 12/1981 | Tribble et al. | 426/271 |
| 4,436,756 | 3/1984 | Canella | 426/430 |
| 4,473,545 | 9/1984 | Drake | 424/22 |
| 4,474,816 | 10/1984 | Wilson | 424/331 |
| 4,555,564 | 11/1985 | Fischer et al. | 528/295.3 |
| 4,708,877 | 11/1987 | Donovan | 426/69 |
| 4,735,809 | 4/1988 | Donovan | 426/69 |
| 4,759,932 | 7/1988 | Laurent | 426/2 |
| 4,795,651 | 1/1989 | Henderson | 426/456 |
| 4,820,526 | 4/1989 | Laurent | 426/2 |

OTHER PUBLICATIONS

Juszkiewicz et al "Mycotoxins in grain for animal feeds" Chem. Abst. vol. 89(7) Abstract No. 58508a.
H. Prebluda "More Than Just a Pellet Binder..." Feed Management, Oct. 1974, pp. 16, 17, 40.
C. Quarles "Zeolites: A new ingredient..." Feedstuffs Oct. 7, 1985, p. 35.
T. K. Smith "Perspectives on Current Problems..." Feedstuffs, Nov. 14, 1983, pp. 19-20.
N. Masimanco et al "Elimination of Aflatoxin B..." Ann. de Nutrition et Alimentation, 1973, 23, 137-147.
Ethacal Feed Component Brochure.
M. S. Carson "Effect of Dietary Fiber..." Thesis University of Guelph, Jan. 1982.
T. K. Smith et al "Nutritional Implication of Fusarium Mycotoxins".
Berenguer et al "Sepiolite in the Field of Animal Nutrition": Fifth Industrial Mineral Conference.
Vrzgula et al, publication Folia Veter, 21, 3-4, 1947 with English abstract, pp. 79-89.

*Primary Examiner*—R. B. Penland
*Attorney, Agent, or Firm*—Inez L. Moselle

[57] ABSTRACT

A dry solid animal feed composition in which biodegradable feed is contaminated with a mycotoxin and is admixed with a mycotoxin inactivating agent comprising particles of a phyllosilicate mineral capable of inactivating mycotoxins, said particles being coated with a sequestering agent in an amount sufficient to enhance the mycotoxin inactivating capacity of said phyllosilicate.

25 Claims, 11 Drawing Sheets

FIG. 11

ANIMAL FEED ADDITIVE AND METHOD FOR INACTIVATING MYCOTOXINS PRESENT IN ANIMAL FEEDS

This is a continuation-in-part of copending application Ser. No. 07/490,013 filed on Mar. 7, 1990 now abandoned.

BACKGROUND OF THE INVENTION

This invention relates to a method for inactivating mycotoxins which may be present as contaminants in animal feeds by adding a phyllosillicate/sequestrant formulation to animal feed which will function as a mycotoxin inactivating agent.

Mycotoxins, chemical substances produced by ubiquitous fungi, can make the difference between profit and loss to the poultry and livestock industries. Animals are extremely vulnerable to mycotoxins due to the common practice of diversion of mycotoxin contaminated agricultural commodities to animal feed. Thus, mycotoxicoses, or mycotoxin-induced diseases, frequently occur in animals.

It is readily apparent from a review of scientific literature that the most studied and prevalent of these agents are the aflatoxins, a group of closely related polysubstituted coumarin derivatives, which are biosynthesized by flavis and parasiticus species of Aspergillus fungi. The aflatoxins have invoked much concern as toxic food and feedborne agents following the discovery that they: 1) are potent carcinogens and mutagens, 2) are stable in foods and feeds and are relatively unaffected by a variety of processing procedures, 3) can be found as residues in the tissues of animals and humans, and 4) are associated with animal and human disease.

A preponderance of poultry and livestock exposure to aflatoxins is chronic in nature and occurs through the ingestion of low levels of these chemicals such as "marginally contaminated" rations which do not increase the mortality rate nor result in obvious signs of disease. Instead, chronic exposure to aflatoxins results in economically important effects in animals such as depression of growth rates, feed conversion, and alteration of immunocompetency which can result in increased susceptibility to infection and decreased ability to resist stress.

Numerous approaches to reduction of aflatoxin levels in agricultural commodities have been experimentally assessed. These include mixing and dilution with aflatoxin-free grains in order to obtain a level within regulatory guidelines, i.e. 20 ppb or less; physical methods of separation such as cleaning, density segregation and preferential fragmentation; solvent extraction; biological inactivation; thermal inactivation; and chemical inactivation with a variety of acids, aldehydes, oxidizing agents and alkalies. These approaches have been relatively unsuccessful on a commercial scale due to lack of efficacy, economic constrains of the protocol, unacceptable alteration of feed quality, or the introduction of potentially deleterious substances. Consequently, simple, cost effective, practical and safe processes by which animal feeds can be decontaminated or detoxified are in great demand.

The present applicant has recognized the widespread detrimental effects of aflatoxins in animal feed and has developed an additive which effectively binds aflatoxins or otherwise inactivates the aflatoxins during ingestion by animals. The bound or inactivated aflatoxins are subsequently excreted in the animal feces resulting in little or no detrimental effects on the animals.

Clay such as montmorillonite have previously been incorporated into poultry feed at levels as low as one percent of the animal ratio as in U.S. Pat. No. 3,687,680. Effects accompanying the addition of montmorillonite included increased growth rate and body weight of the chickens and reduced mortality rate. Dietary additions of zeolites (Smith, *J. Animal Science*, 1980 Vol. 50(2), pp. 278-285), bentonite (Carson, M.S. Thesis University of Guelph, Canada 1982) and spent bleaching clay from canola oil refining (Smith, *Can. J. Animal Science*, 1984, Vol. 64, pp. 725-732), have been shown to diminish the adverse effects of T-2 toxin and zearalenone in rats and immature swine. The adsorption of aflatoxin B1 from various liquid media by various clay minerals, including montmorillonites, has been reported (Masimanco et al., *Ann. de Nutrition et Alimentation*, 1973 Vol. 23, pp. 137-147).

SUMMARY OF THE INVENTION

Accordingly, it is the object of the instant invention to provide an animal feed additive which eliminates the adverse effects of mycotoxins, especially aflatoxins, which are present in the feed without promoting undesirable side effects in the animals such as weight loss. It is a further object of the instant invention to provide a method to prevent the effects of mycotoxin (aflatoxin) intake in animals, especially poultry and swine, through the cojoint administration of minimal amounts of these additives with normal animal feeds.

The present inventors surprisingly have discovered that the incorporation of a second ingredient, chosen from a group of sequestrants commonly used in food processing, along with a suitable phyllosilicate capable of inactivating a mycotoxin, preferably a montmorillonite clay, produces a material exhibiting heightened capacity for adsorbing aflatoxin in vitro and further that such materials also exhibit substantially enhanced capability for reducing the effect of exposure to aflatoxin in vivo.

Further, it has been discovered that such formulations can be utilized as feed additives to effectively bind mycotoxins, such as aflatoxins, which are ingested in conjunction with animal feed. The bound mycotoxin-additive complex is not significantly adsorbed during digestion and it is then excreted in the feces of the animal.

It appears that the additives, that is, the phyllosilicate/sequestrant complexes, which are utilized in the present invention as feed additives and supplements, act as biosequestrants which promote the maintenance of normal body weight gains in animals such as poultry. These additives reduce the levels of parent mycotoxins, especially aflatoxins, which are available for assimilation in their digestive tracts during feeding. These additives effectively bind the mycotoxins and eliminate them in the feces. These additives are effective when used in minimal amounts as feed additives for providing protection against mycotoxicoses during ingestion and digestion of the animal feed which is contaminated with mycotoxins, particularly aflatoxins. The additives of the present invention are combined with a substantially complete animal ration in minor amount, for example, an amount ranging from 0.05 to 1.5 weight percent of the ration, preferably 0.1 to 0.5 weight percent, most preferably 0.2 to 0.6 weight percent of the feed ration.

One aspect of the invention comprises a dry particulate animal feed additive comprising particles of a suitable phyllosilicate mineral coated with a minor amount of a water-soluble sequestering agent in an amount sufficient to enhance the mycotoxin inactivating capacity of the phyllosilicate mineral.

Another aspect of the invention comprises a dry solid animal feed composition in which biodegradable feed is contaminated with a mycotoxin and is admixed with a minor amount of a mycotoxin inactivating agent comprising particles of a phyllosilicate mineral capable of inactivating mycotoxins, the phyllosilicate mineral particles being coated with a sequestering agent in amount sufficient to enhance the mycotoxin inactivating capacity of the phyllosilicate mineral.

In the preferred embodiments of the invention, the phyllosilicate is a smectite clay, most preferably a montmorillonite clay in which the ratio of divalent plus trivalent/monovalent exchangeable cations is greater than 7.

The preferred phyllosilicates used in practice of the invention are montmorillonite clays which are known to possesses two kinds of binding sites: 1) those located on the basal planes of the clay particles, and 2) those located at the edges of the clay particles. Although the identity of the sites involved in binding aflatoxin is unknown, three possibilities exist: 1) binding is occurring only on basal sites; 2) binding is occurring only on edge sites; or 3) binding is occurring on both basal and edge sites. One surprising aspect of the present invention is that the incorporation of various sequestrants actually enhances binding of aflatoxin even though some of the sequestrants used in the present invention are phosphate and polyphosphate salts which are known (Theng, "The Chemistry of Clay-Organic Reaction", John Wiley & Sons, NY, 1974, pp. 264–268) to bind selectively to edge sites (thereby rendering them unfit for binding other molecules). Under these circumstances it was expected that if case 1 were operative, there should be no effect of the added phosphate; if case 2 were operative, there should be complete inhibition of aflatoxin binding, and if case 3 were operative, there should be some degree of inhibition. But for none of these cases was it expected that there would be an increase in aflatoxin binding even though that is what was actually observed.

BRIEF DESCRIPTION OF THE DRAWINGS

Figure 11:
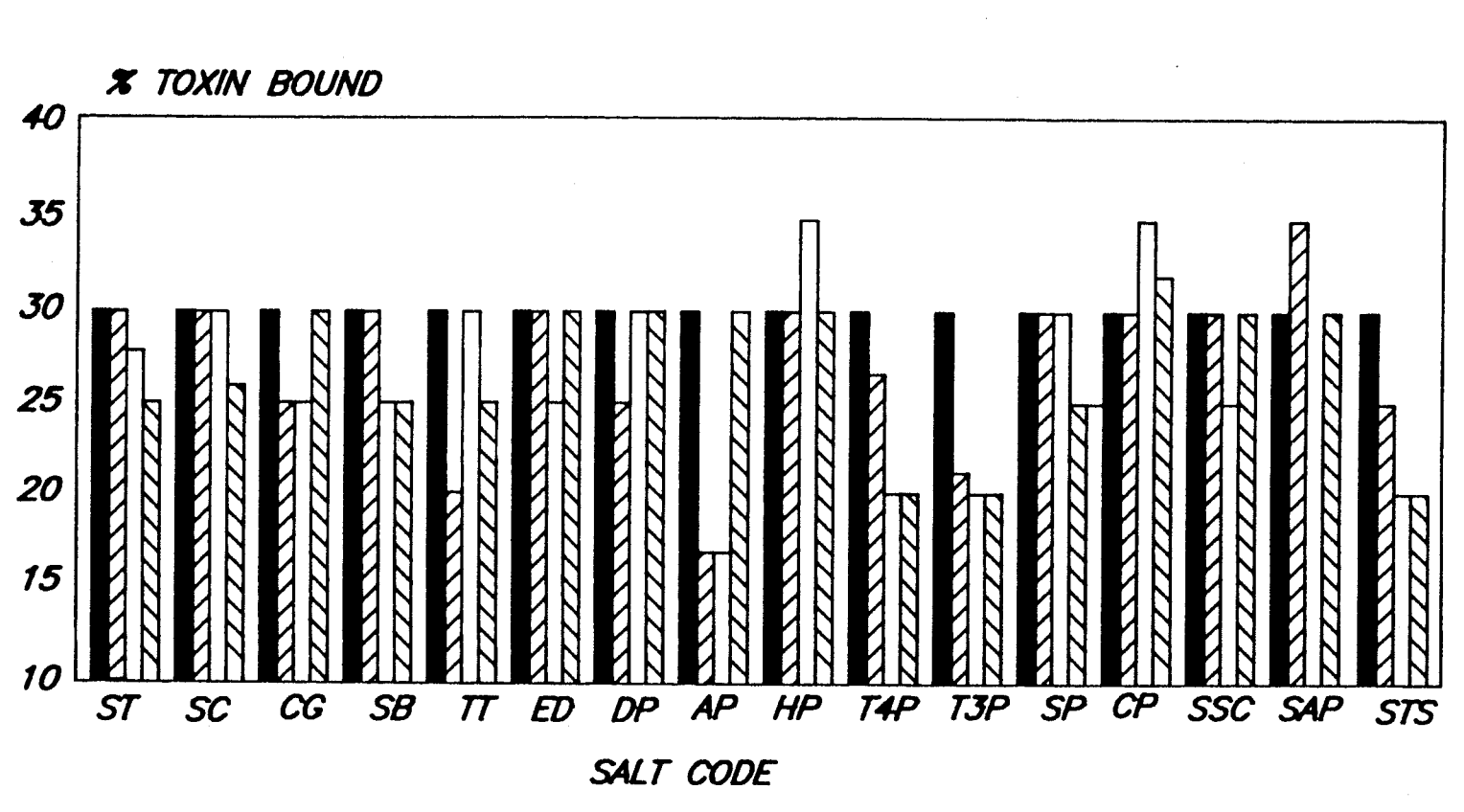

FIGS. 8–11. Deoxynivalenol, zearalenone, ochratoxin A, citrinin binding capacity versus sequestrant type and loading on clay B.

DESCRIPTION OF PREFERRED EMBODIMENTS

Figure 1:
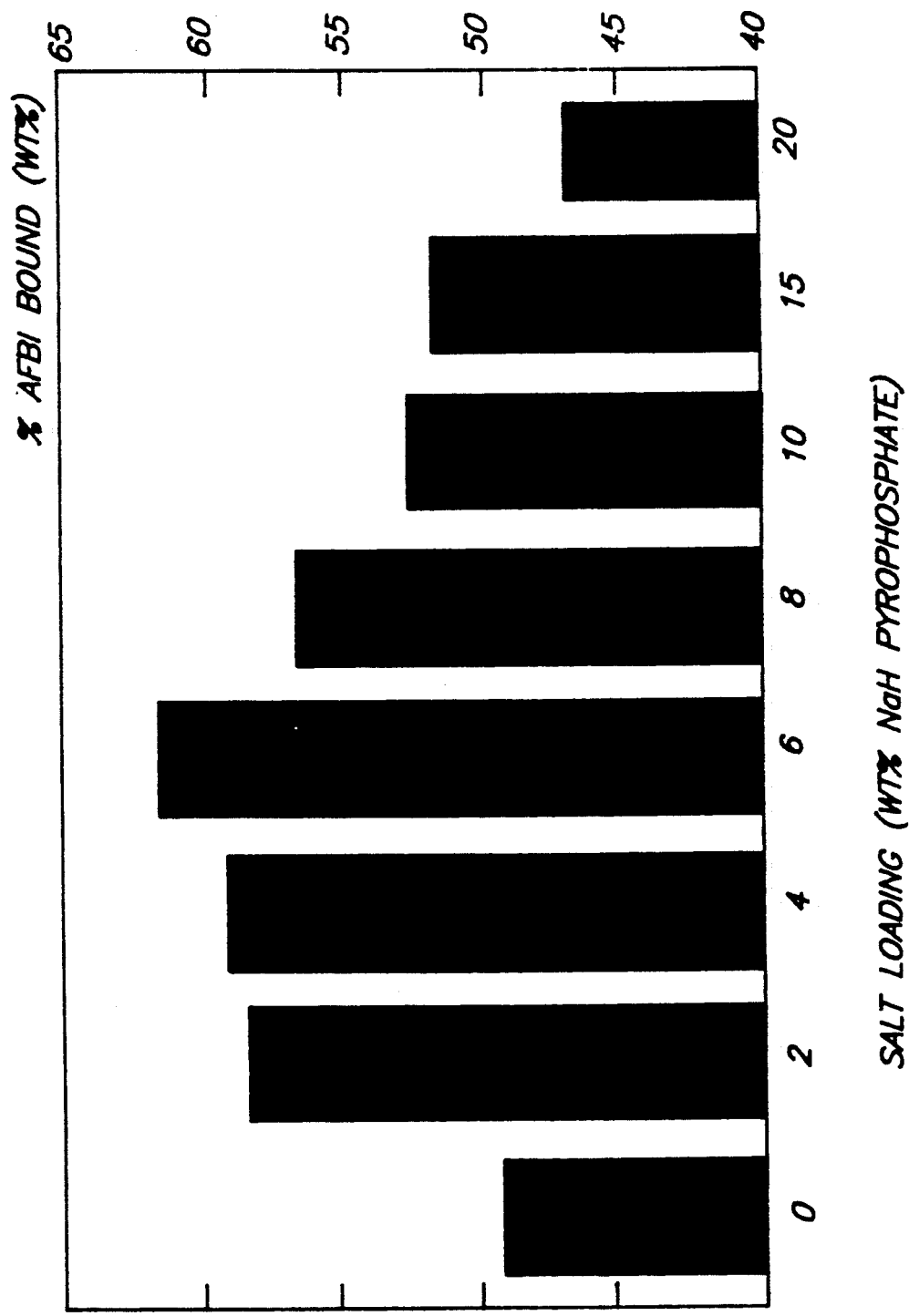
FIG. 1. Aflatoxin binding capacity versus sequestrant "AP" loading on clay A.

Additives of the invention are utilized as small granules or powders and should be thoroughly mixed with the animal feed by any suitable manner prior to feeding. The terms "animal feed" or "feed ration" as used in the present invention refer to any natural and processed or otherwise modified organic materials which are susceptible to biodeterioration and which can be consumed by animals or birds for nourishment. Examples of such organic materials would range from freshly harvested grains to pelletized feeds. The preferred animal feeds for use in the instant invention are poultry and livestock feeds.

The additives which can be utilized in the instant invention as mycotoxin (such as aflatoxin) inactivating agents include various sequestrant/phyllosilicate formulations wherein the phyllosilicate portion of the formulation is preferably a smectite type clay. Structurally, phyllosilicates are essentially made up of layers formed by condensation of sheets of linked $Si(O,OH)_4$ tetrahedra with those of linked $M_{2-3}(OH)_6$ octahedra, where M is either a divalent or trivalent cation or combination thereof. In addition to possessing the aforementioned properties, smectite clays also possess a lesser amount of mobile (exchangeable) cations that can be easily solubilized when these clays are added to water. Phyllosilicate minerals include pyrophyllite, talc, vermiculite, micas, kaolinites, and serpentines as well as smectites. Closely related to the phyllosilicates are the fibrous clay minerals including attapulgite and sepiolite. Examples of the preferred smectite clays are: montmorillonite, Na-montmorillonite, Ca-montmorillonite, Na-bentonite, Ca-bentonite, beidellite, nontronite, saponite, and hectorite. Most preferred are those montmorillonites possessing relatively high ($+2$, $+3/+1$) exchangeable cation ratios (i.e. -greater than 7).

The sequestrant portion of the sequestrant/clay formulation would include food-grade sequestrant salts used in food processing. A partial list of such substances would include: sodium, calcium and potassium acetates; sodium, calcium and potassium citrates as well as the free acid and monoisopropyl, monoglyceride stearyl and triethyl derivatives thereof; disodium dihydrogen and disodium calcium salts of ethylenediaminetetraacetic acid (EDTA); calcium and sodium gluconates; oxystearin; ortho phosphates (monocalcium acid, dibasic potassium, sodium aluminum, dibasic sodium, monobasic sodium, tribasic sodium); meta phosphates (calcium hexameta, sodium hexameta); pyro phosphates (tetrasodium, sodium acid); sodium tripolyphosphate; calcium phytate; sodium and sodium potassium tartrates as well as the free acid; and sodium thiosulfate and mixtures thereof.

Many of these sequestrants, for example citrate salts and condensed phosphate salts (e.g., poly and pyrophosphates) are clay dispersants. It is worth noting that although condensed phosphate salts and citrate salts can act as either dispersants (substances for bringing fine particles in water into suspension which usually decreases viscosity) or flocculants (substances for bringing fine particles in water together to form agglomerates which usually increases viscosity), the levels used in these preferred embodiments causes them to act primarily as flocculants. Accordingly, almost all of the sequestrant/clay slurries prepared in the following examples exhibited much higher viscosities than the corresponding pure clay slurries. This would seem to rule out simple dispersion (and increased available surface area) of the clay particles as the mechanism by which enhanced adsorption of aflatoxin is achieved.

A typical preparation of a preferred sequestrant/phyllosilicate formulation is as follows:
1) Dissolve sodium tripolyphosphate (STP) in water (10:90 parts/wt. ratio).
2) Add STP solution to dried (~25 wt % loss-on-ignition) and ground (60–100 mesh) montmorillonite clay in pugging machine such that the STP and clay are present in a 4:96 parts/wt. ratio (dry basis).
3) Pug clay/STP/water combination for 15–30 minutes to effect intimate mixture of ingredients.
4) Extrude the clay/STP/water mixture (5/16" or ⅜" die).
5) Dry resultant pellets (15–25 wt % loss-on-ignition)in tray or rotary drier.
6) Grind pellets to form granules (16–60 mesh) or powder (100–200 mesh).

Another example of a procedure to prepare a preferred formulation would be as follows:
1) Dissolve tetrasodium pyrophosphate (TSPP) in water.
2) Add the TSPP solution to montmorillonite clay such that the TSPP:clay ratio is 4:96 and the resultant clay/TSPP/water slurry contains 15 wt % solids (clay+TSPP).
3) Mix components for 30 minutes using a Talboy mixer.
4) Spray dry the mixture using any suitable type of spray drier such that resultant microspheres have most of their diameters in the 60–80 micron range and possess 3–5 wt % free moisture.

The following examples illustrate the invention and are not considered restrictive of the invention as otherwise described herein.

EXAMPLE I

The following in vitro tests were performed to demonstrate the enhancement in aflatoxin B1 binding capacity that results when a Ca-montmorillonite clay obtained in Mississippi (Clay A) was coated with various levels of sodium acid pyrophosphate. In this example, a clay slurry was prepared by mixing the dried (8–12% free moisture) and ground (93–97% T-100 mesh) clay in water (20 wt % solids), and then adding different amounts of sodium acid pyrophosphate to the stirred slurry such that the desired sequestrant level (dry wt. basis) was obtained. The components were mixed for 30 minutes and then poured into evaporating dishes and placed in an oven at 90°–110° C. overnight. After drying, the samples were pulverized in a hammer mill and subsequently screened to obtain a −325 mesh fraction for further testing. Moisture content, surface area, and pore volumes for these preparations are listed in Table 1.

In vitro binding studies were conducted using these materials as follows: A weighed sample of additive was placed into a clean 16×125 mm disposable glass test tube. To this was added 5.00 ml of distilled water. The tube was vortexed for 15 sec and then placed in a 37° C. water bath and allowed to equilibrate for 1 hr. After 1 hr, 40 μg of aflatoxin B1 was introduced (in a 1 μg/μl solution). The tube was vortexed for 15 sec and then returned to the water bath and allowed to stand at 37° C. for 15 min. The supernatant was carefully decanted into a clean test tube. The supernatant was then extracted to recover the remaining mycotoxin.

The supernatant was extracted 3 times with 2 ml portions of dichloromethane. The dichloromethane solutions were combined and evaporated to dryness under a nitrogen stream prior to analysis. The dried residue from the aflatoxin binding study was redissolved in a known volume of chloroform, 2 μl of this solution was spotted on HPTLC plate (Analtech) and developed using a 9/1 chloroform/acetone (v/v) solvent system.

TABLE 1

AFLATOXIN B1 BINDING VS SALT LOADING CLAY A/SODIUM ACID PYROPHOSPHATE

| % LOD(1) (110° C.) | SURFACE AREA(2) (sq. m/g) | PORE VOLUME(3) (cc/g) | SALT LOADING (wt %) | % AFB1 BOUND | |
|---|---|---|---|---|---|
| | | | | LEVEL 1 | LEVEL 2 |
| 0 | 59 | 0.093 | 0 | 49.0 | 99.2 |
| 0 | 57 | 0.085 | 2 | 58.3 | 98.5 |
| 0 | 50 | 0.089 | 4 | 59.2 | 99.2 |
| 0 | 42 | 0.082 | 6 | 61.8 | 98.9 |
| 0 | 36 | 0.077 | 8 | 56.7 | 98.5 |
| 0 | 27 | 0.067 | 10 | 52.7 | 98.3 |
| 0 | 17 | 0.057 | 15 | 51.7 | 99.2 |
| 0 | 15 | 0.044 | 20 | 46.7 | 99.4 |

(1) LOD = Wt % loss on drying at 110 degrees C. for 4 hrs.
(2) Measured by BET method.
(3) Measured by BHJ method.
Level 1 - 1 mg sorbent/40 ug toxin.
Level 2 - 100 mg sorbent/40 ug toxin.

Quantitation was made by visual comparison to known quantities of aflatoxin B1 spotted on the same plate. Analysis of the aflatoxin controls was by GC/MS as well as HPTLC. All samples were run in triplicate. Tetrahydrofuran (THF) which had been freshly distilled from sodium metal was used as the delivery solvent for aflatoxin B1. The percent recovery of aflatoxin B1 from the supernatant was determined from control samples run for each experiment. The percent recovery of aflatoxin B1 was consistently found to be 100% for each experiment-as confirmed by GC/MS, TLC and HPLC quantitation.

As shown by the data in Table 1 and the associated graph (FIG. 1), there is a substantial enhancement in the amount of aflatoxin bound when the clay contains sodium acid pyrophosphate sequestrant. According to the graph shown in FIG. 1, a maximum in enhancement is achieved when the clay contains about 6 wt % of the phosphate salt. Clearly, higher levels of phosphate salt lead to reduced efficiency of binding; in the extreme case when the clay contains 20 wt % of the salt, the binding capacity is actually somewhat below that of the untreated clay. While the reasons for this reduced binding efficiency at higher salt loadings is unknown, it is worth noting (Table 1) that both surface area and porosity decrease as salt levels increase. This suggests there may be a trade off between the enhancement in binding caused by adding the sequestrant and the reductions it causes to surface area and porosity. As expected, higher levels of additive bind more of the toxin (compare Level 1 vs. Level 2)-when 100 mg of sorbent are used with the standard aflatoxin solution, essentially all of the mycotoxin is bound.

EXAMPLE II

The following in vitro tests were performed to demonstrate the enhancement in aflatoxin B1 binding capacity and stability that results when a Ca-montmorillonite clay obtained in Mississippi (Clay B) was treated with various levels of different (salt) sequestrants. Oven dried samples were prepared as described in Example I; spray dried samples were prepared as previously described (vide supra).

In vitro binding studies were conducted using these materials as follows: A weighed sample of additive was placed into a clean 16×125 mm disposable glass test tube. To this was added 5.00 ml of Type III water (equivalent to double-distilled deionized water). The tube was gently agitated for 15 sec and then placed in a 37° C. water bath and allowed to equilibrate for 1 hr. After 1 hr, 40 $\mu$g of aflatoxin B1 was introduced (in a 1 $\mu$g/$\mu$l solution). The tube was vortexed for 15 sec at 15 min intervals (15,30, and 45 min). After 1 hr, the tube was centrifuged for 5 min at 1200 rpm to yield a pellet at the bottom of the tube, and a clear supernatant liquor above. The supernatant was then carefully decanted into a clean test tube. The supernatant was then extracted to recover the remaining mycotoxin to determine (capacity of) binding. The residual clay was extracted to determine strength (stability) of binding.

In vitro Capacity Tests:

The supernatant was extracted 3 times with 2 ml portions of dichloromethane. The dichloromethane solutions were combined and evaporated to dryness under a nitrogen stream prior to analysis. The dried residue from the aflatoxin binding study was redissolved in a known volume of chloroform, 2 $\mu$l of this solution was spotted on HPTLC plate (Analtech) and developed using a 9/1 chloroform/acetone (v/v) solvent system. Quantitation was made by visual comparison to known quantities of aflatoxin B1 spotted on the same plate. Additionally, an aliquot of the chloroform solution was injected onto a Water HPLC system (normal phase radial compression column, Pon's solution was used as a running phase). HPLC detection was by UV absorbance at 365 nm. The quantitations were made by direct comparisons to a standard curve generated with known quantities of pure aflatoxin B1.

In vitro Stability Tests:

The residual clay from the 60 min binding studies was extracted by first suspending the clay in 3 ml of methanol. This was allowed to stand at room temperature for 5 min at which time the suspension was centrifuged for 5 min at 1200 rpm. The methanol was decanted into a clean test tube. The pellet was then resuspended in 5 ml of dichloromethane and allowed to stand at room temperature for an additional 5 min. At this time the suspension was carefully decanted into the first (methanol) extract. The organic phases were evaporated to dryness under a nitrogen stream and analyzed using the same procedure as that used in the capacity study. The amount of tightly bound (stable) toxin was assumed to be the difference between the amount of toxin initially added and the amount recovered from both the aqueous phase and the extract from the residual clay.

With regard to stability of binding, Table 2 contains the data on the percentage of aflatoxin firmly bound to these formulations when subjected to the stability test procedure described above. As is clear, these formulations form extremely stable complexes with the aflatoxin and most retain greater than 95% of the aflatoxin once it is adsorbed.

TABLE 2

AFLATOXIN B1 BINDING VS. SALT LOADING
EFFECT OF SALT TYPE WITH CLAY B

| SALT TYPE/LOADING | SALT CODE | AFB1 BINDING CAPACITY | | | | AFB1 BINDING STABILITY | | | |
|---|---|---|---|---|---|---|---|---|---|
| | | 0% | 4% | 7% | 10% | 0% | 4% | 7% | 10% |
| Na Thiosulfate | ST | 88.3 | 87.8 | 95.0 | 94.2 | 98.3 | 98.5 | 99.4 | 98.4 |
| Na Citrate | SC | 88.3 | 95.0 | 95.0 | 92.5 | 98.3 | 97.4 | 97.0 | 95.5 |
| Ca Gluconate | CG | 88.3 | 90.0 | 81.7 | 80.0 | 98.3 | 99.2 | 96.3 | 95.5 |
| Sorbitol | SB | 88.3 | 87.5 | 95.0 | 92.5 | 98.3 | 89.0 | 96.0 | 95.0 |
| Na Tartrate | TT | 88.3 | 92.5 | 95.0 | 97.5 | 98.3 | 96.0 | 91.5 | 98.8 |
| EDTA | ED | 88.3 | 95.0 | 97.5 | 98.0 | 98.3 | 97.0 | 99.0 | 99.8 |
| DiNa Phosphate | DP | 88.3 | 97.0 | 97.5 | 97.0 | 98.3 | 98.0 | 99.3 | 96.3 |
| Na Acid Pyrophosphate | AP | 88.3 | 92.5 | 90.0 | 87.3 | 98.3 | 99.7 | 99.2 | 98.5 |
| Na Hexametaphosphate | HP | 88.3 | 97.0 | 92.5 | 98.0 | 98.3 | 99.5 | 99.2 | 99.0 |
| TetraNa Pyrophosphate | T4P | 88.3 | 97.0 | 97.5 | 95.0 | 98.3 | 98.5 | 95.5 | 97.0 |
| Na Tripolyphosphate | T3P | 88.3 | 92.5 | 95.0 | 97.0 | 98.3 | 98.5 | 95.0 | 98.3 |
| Na Propionate | SP | 88.3 | 92.5 | 87.5 | 82.5 | 98.3 | 97.4 | 97.0 | 94.3 |
| Ca Phytate | CP | 88.3 | 85.0 | 77.5 | 87.0 | 98.3 | 92.0 | 97.1 | 98.9 |
| Spray dried Na Citrate | SSC | 88.3 | 98.0 | 97.5 | 97.0 | 98.3 | 98.7 | 98.8 | 96.3 |
| Spray dried Na Acid Pyrophosphate | SAP | 88.3 | 92.5 | 95.0 | 90.0 | 98.3 | 99.9 | 99.4 | 99.6 |
| Spray dried TetraNa Pyrophosphate | STS | 88.3 | 97.0 | 92.5 | 88.0 | 98.3 | 97.7 | 95.7 | 95.0 |
| BINDING CONDITIONS: | | 1 mg sorbent/40 ug toxin Dichloromethane 60 min/37° C. | | | | 50 mg sorbent/40 ug toxin MeOH/Acetone 60 min/37° C. | | | |

TABLE 3

PHYSICAL PROPERTIES VS. SALT LOADING
EFFECT OF SALT TYPE WITH CLAY B

| SALT TYPE/LOADING | SALT CODE | BET SURFACE AREA (sq m/g) | | | | BHJ PORE VOLUME (cc/g) | | | |
|---|---|---|---|---|---|---|---|---|---|
| | | 0% | 4% | 7% | 10% | 0% | 4% | 7% | 10% |
| Sorbitol | SB | 88 | 45 | 28 | 22 | 0.14 | — | — | — |
| EDTA | ED | 88 | 41 | 24 | 18 | 0.14 | 0.11 | 0.07 | 0.06 |
| Na Acid Pyrophosphate | AP | 88 | 79 | 75 | 66 | 0.14 | — | — | — |
| Na Hexametaphosphate | HP | 88 | 74 | 71 | 72 | 0.14 | 0.13 | 0.12 | 0.12 |
| TetraNa Pyrophosphate | T4P | 88 | 74 | 77 | 64 | 0.14 | 0.13 | 0.13 | 0.11 |
| Na Tripolyphosphate | T3P | 88 | 75 | 85 | 74 | 0.14 | 0.12 | 0.13 | 0.11 |
| Spray dried TetraNa Pyrophosphate | STS | 88 | 68 | 78 | 54 | 0.14 | 0.16 | 0.16 | 0.15 |

Figure 2:
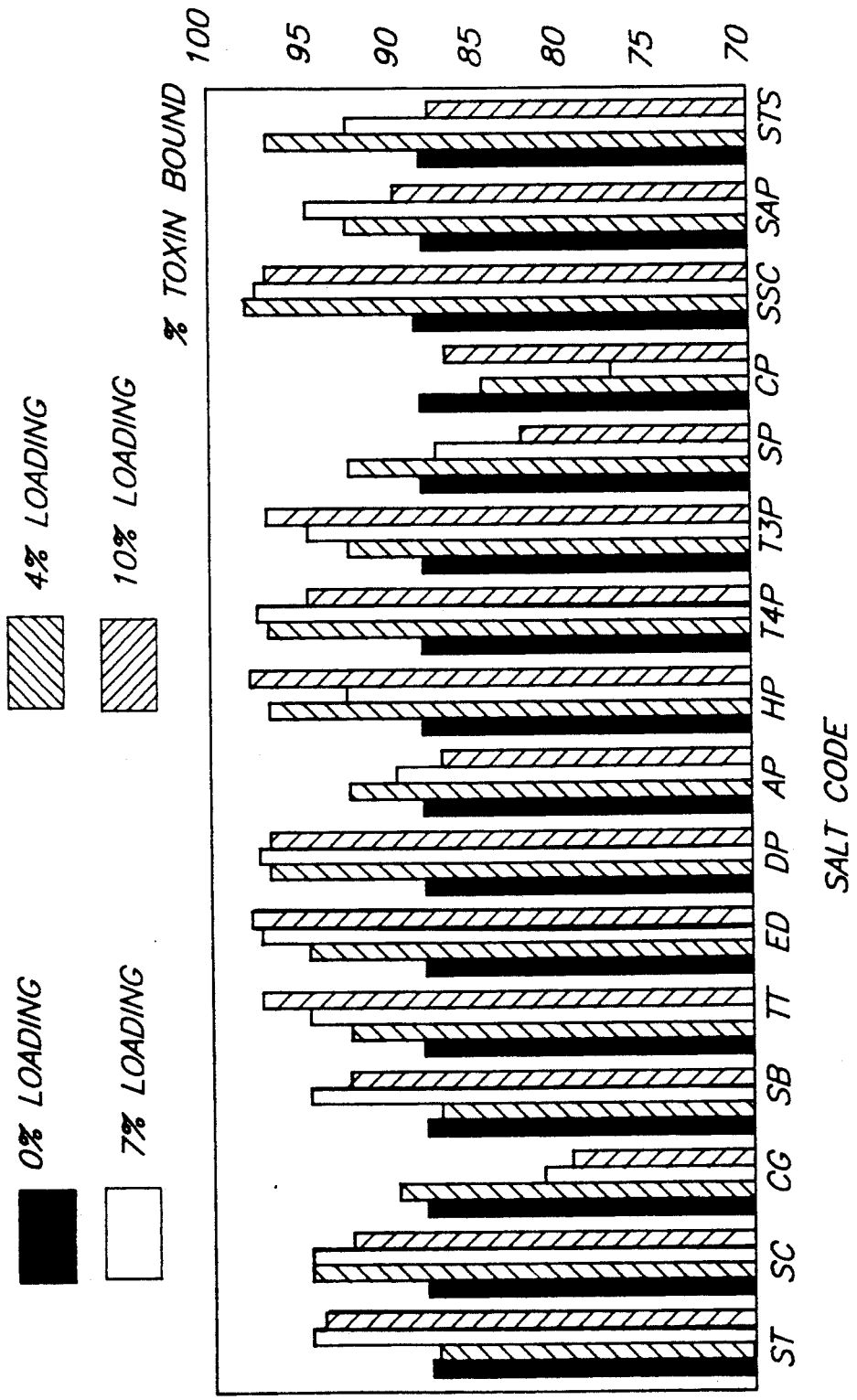
FIG. 2. Aflatoxin binding capacity versus sequestrant type and loading on clay B.
Figure 3:
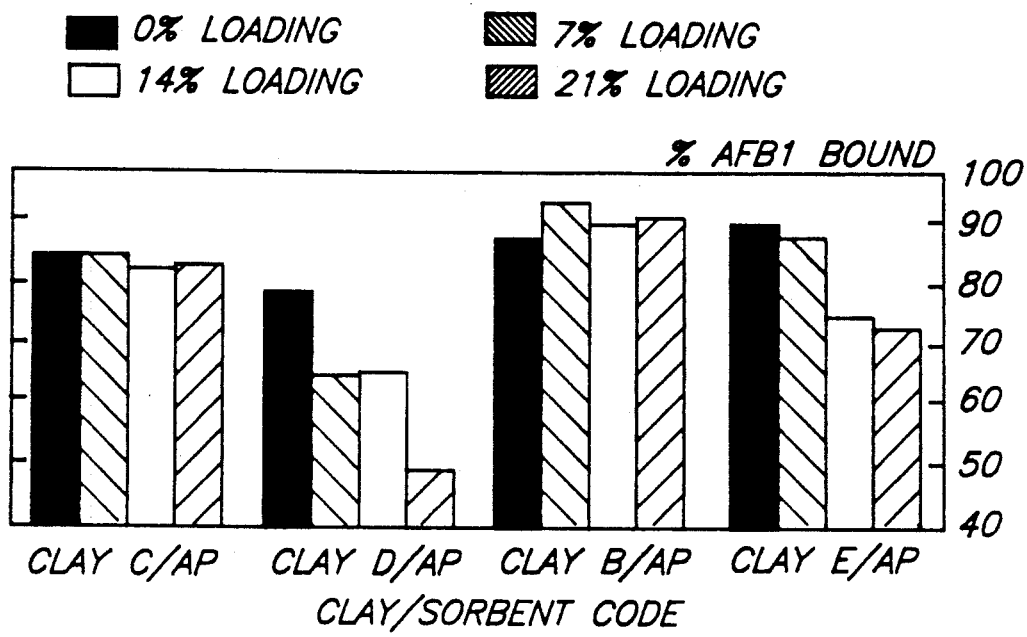
FIG. 3. Aflatoxin binding capacity versus sequestrant "AP" loading on clays B,C,D, and E.
Figure 4:
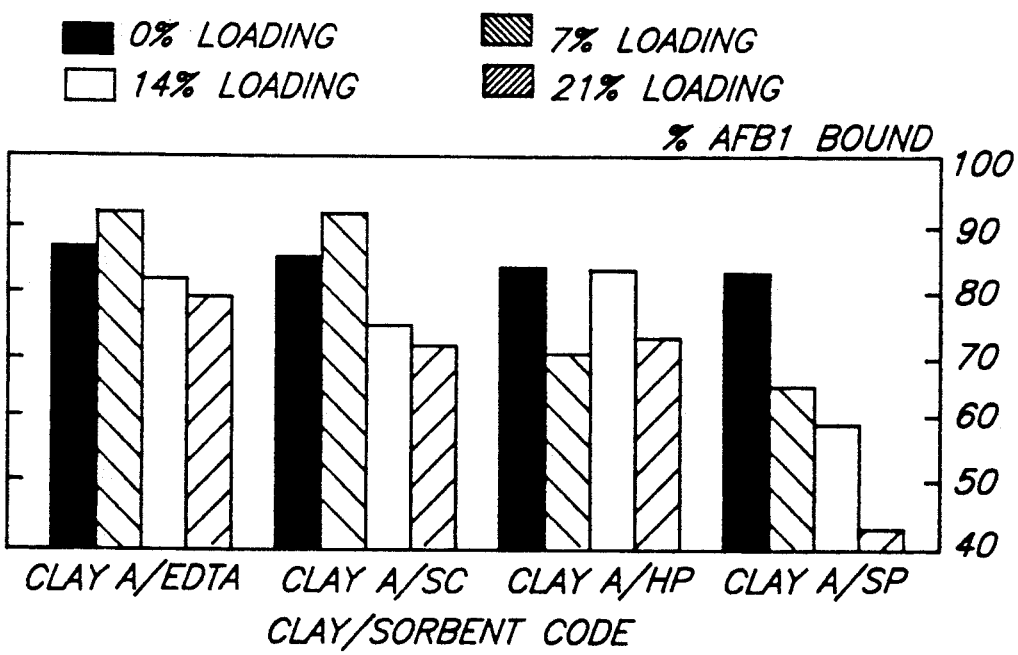
FIG. 4. Aflatoxin binding capacity versus sequestrant type and loading on clay A.
Figure 5:
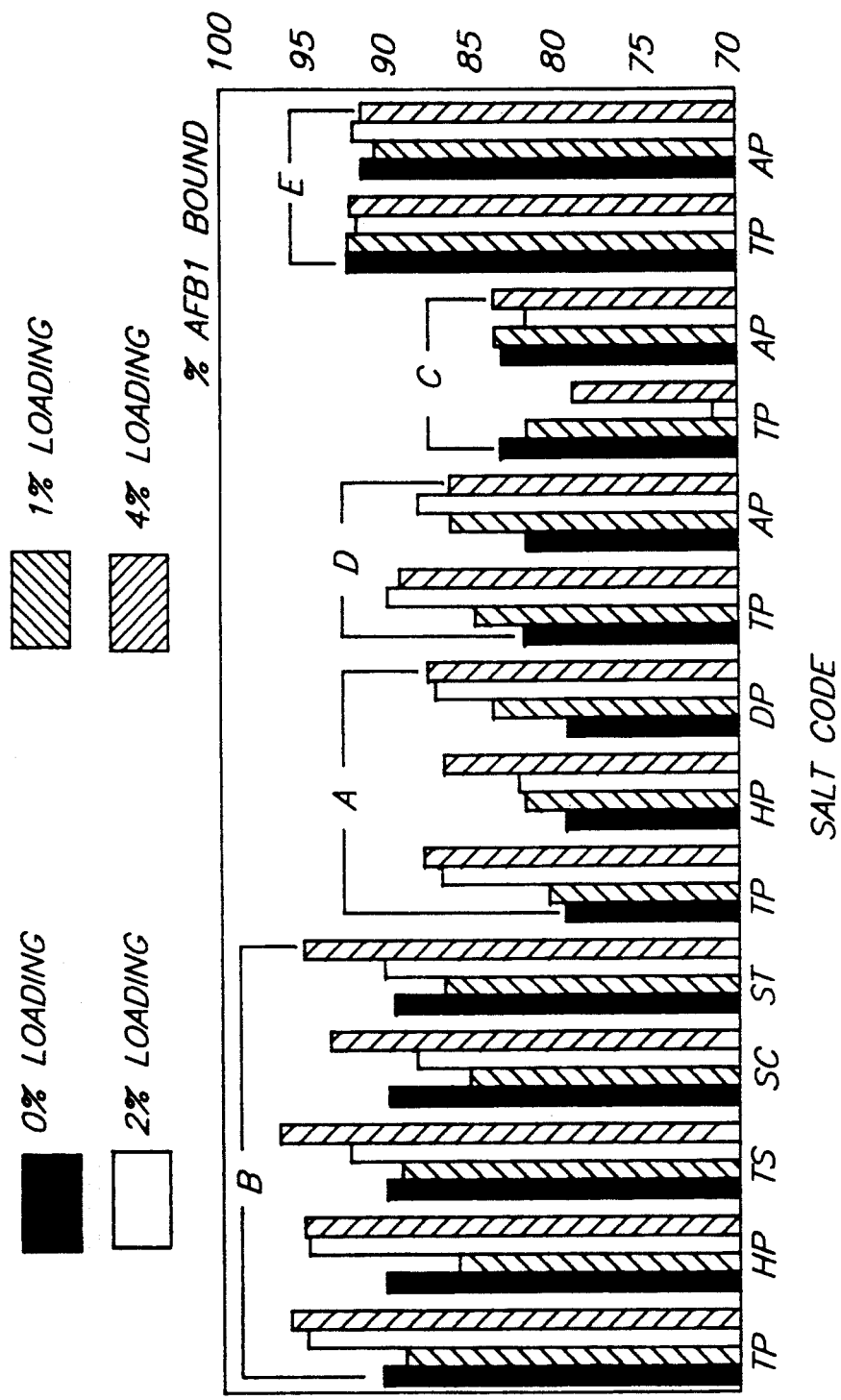
FIG. 5. Aflatoxin binding capacity versus selected sequestrant/clay combinations, low sequestrant loadings.
Figure 6A:
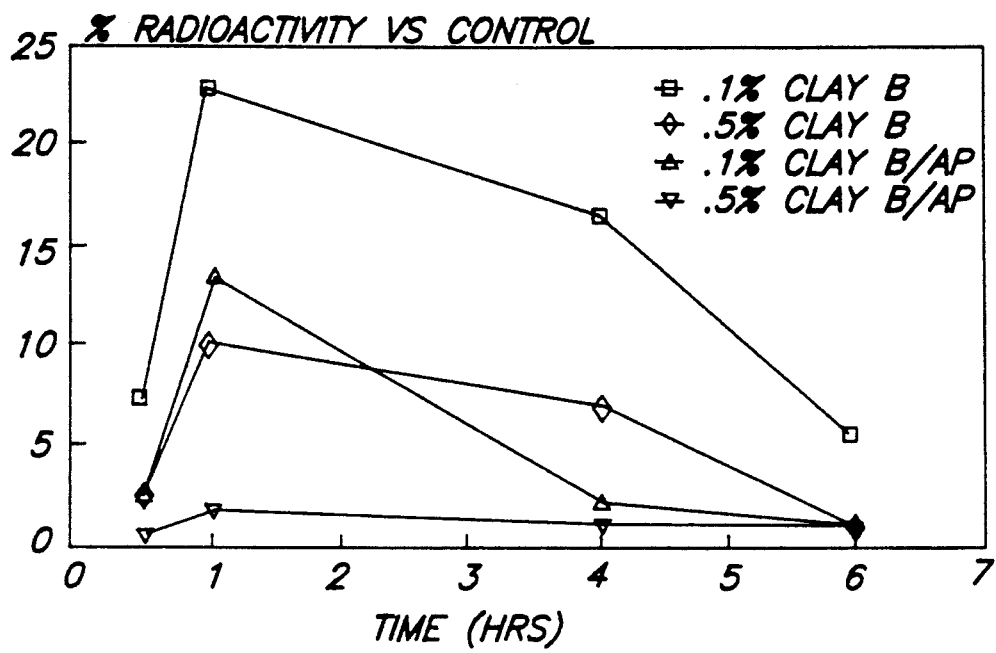
FIGS. 6A,B. Aflatoxin in blood serum of chickens fed sequestrant/clay versus clay alone: 20 ppb and 80 ppb aflatoxin challenges, respectively.
Figure 6B:
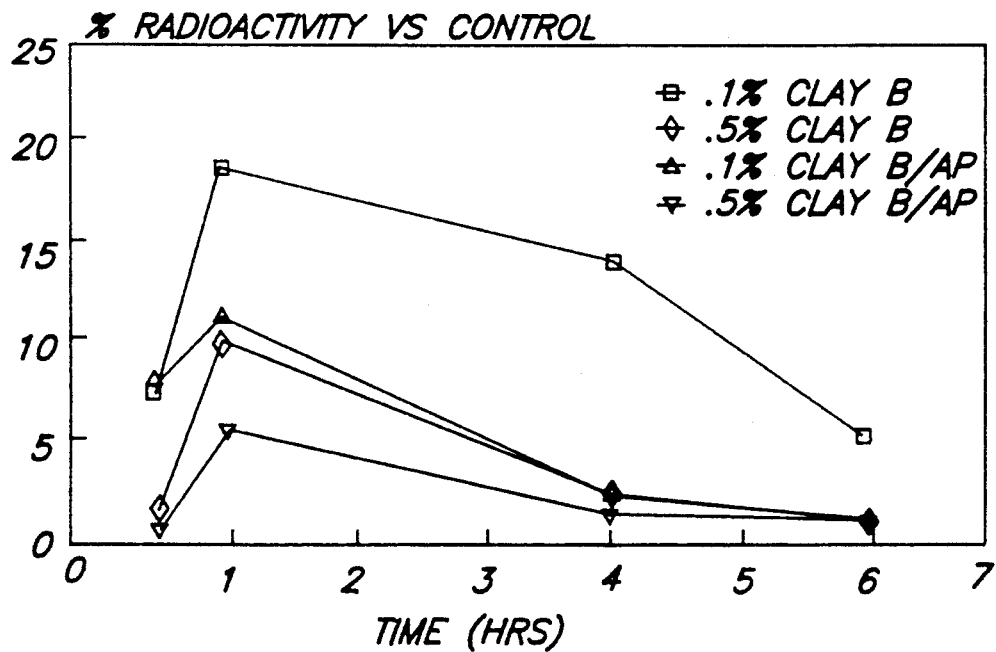
Figure 7A:
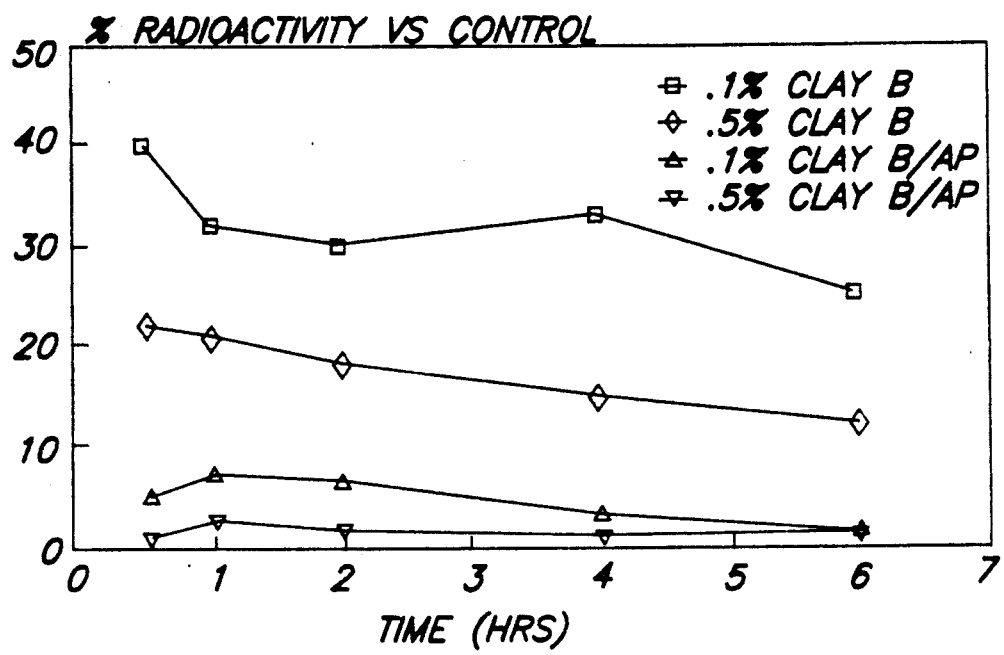
FIGS. 7A,B. Same as above expect liver tissue.
Figure 7B:
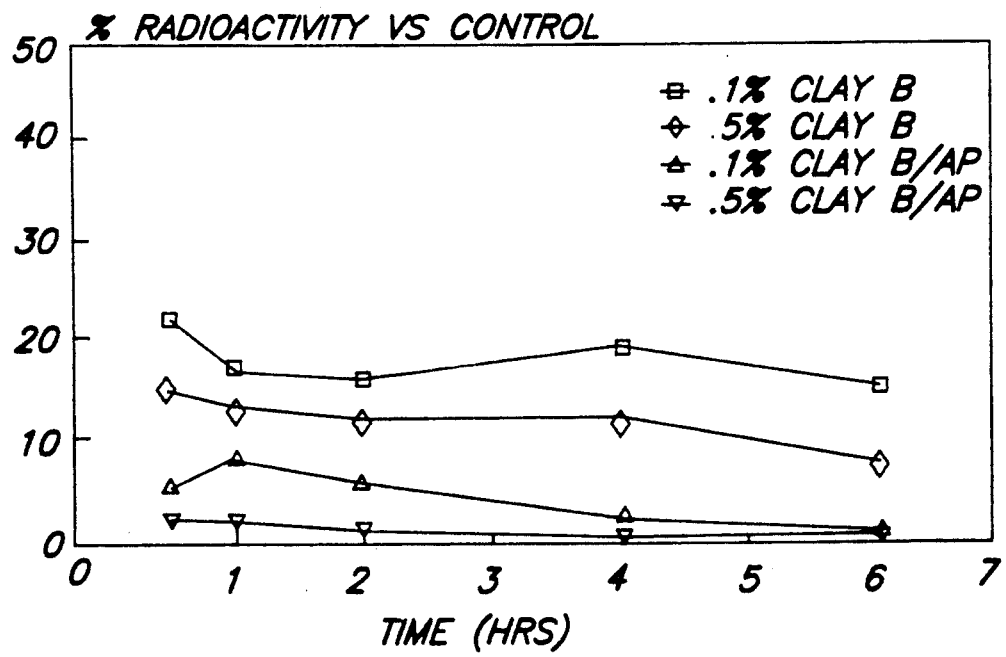
Figure 8:
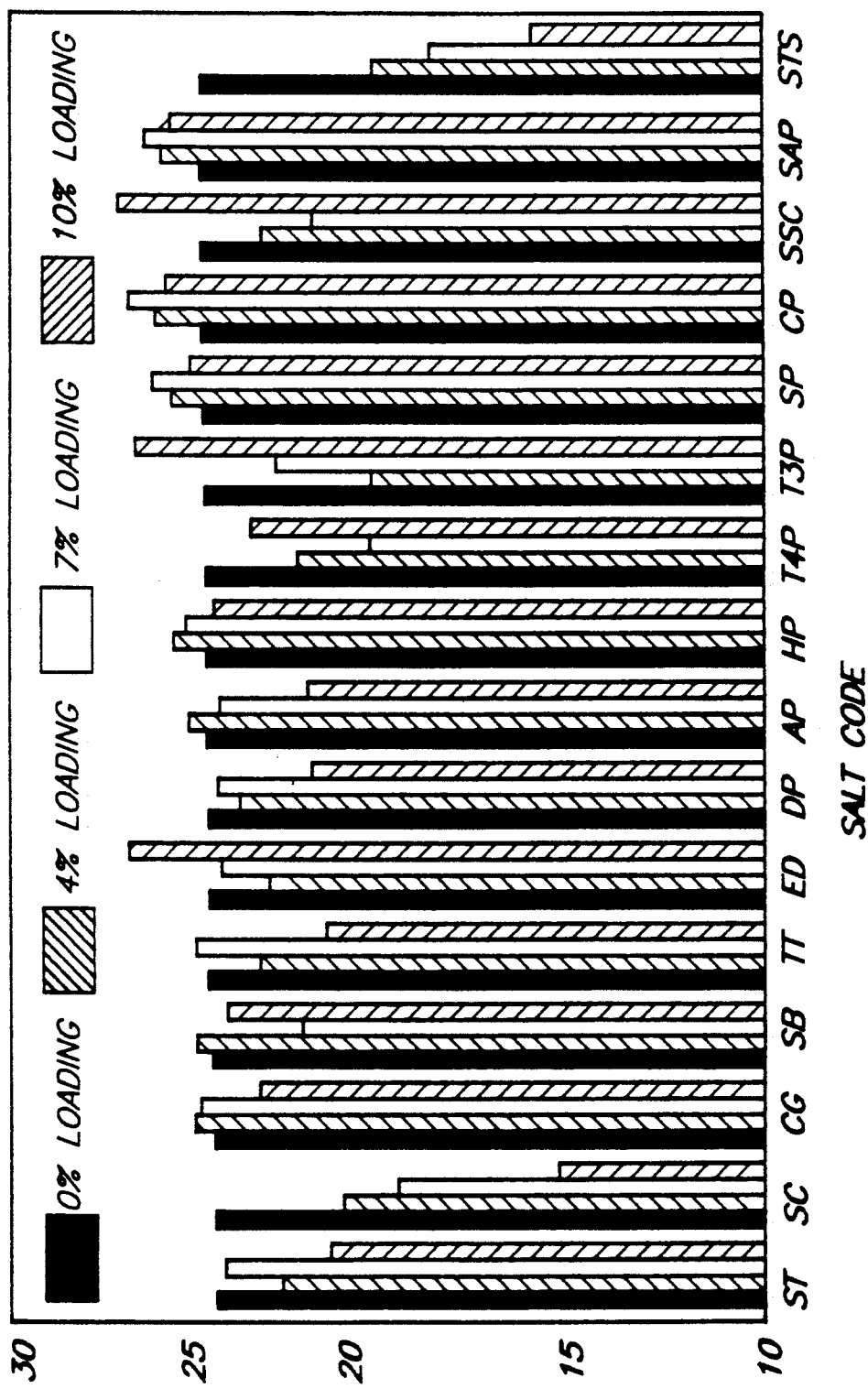
Figure 9:
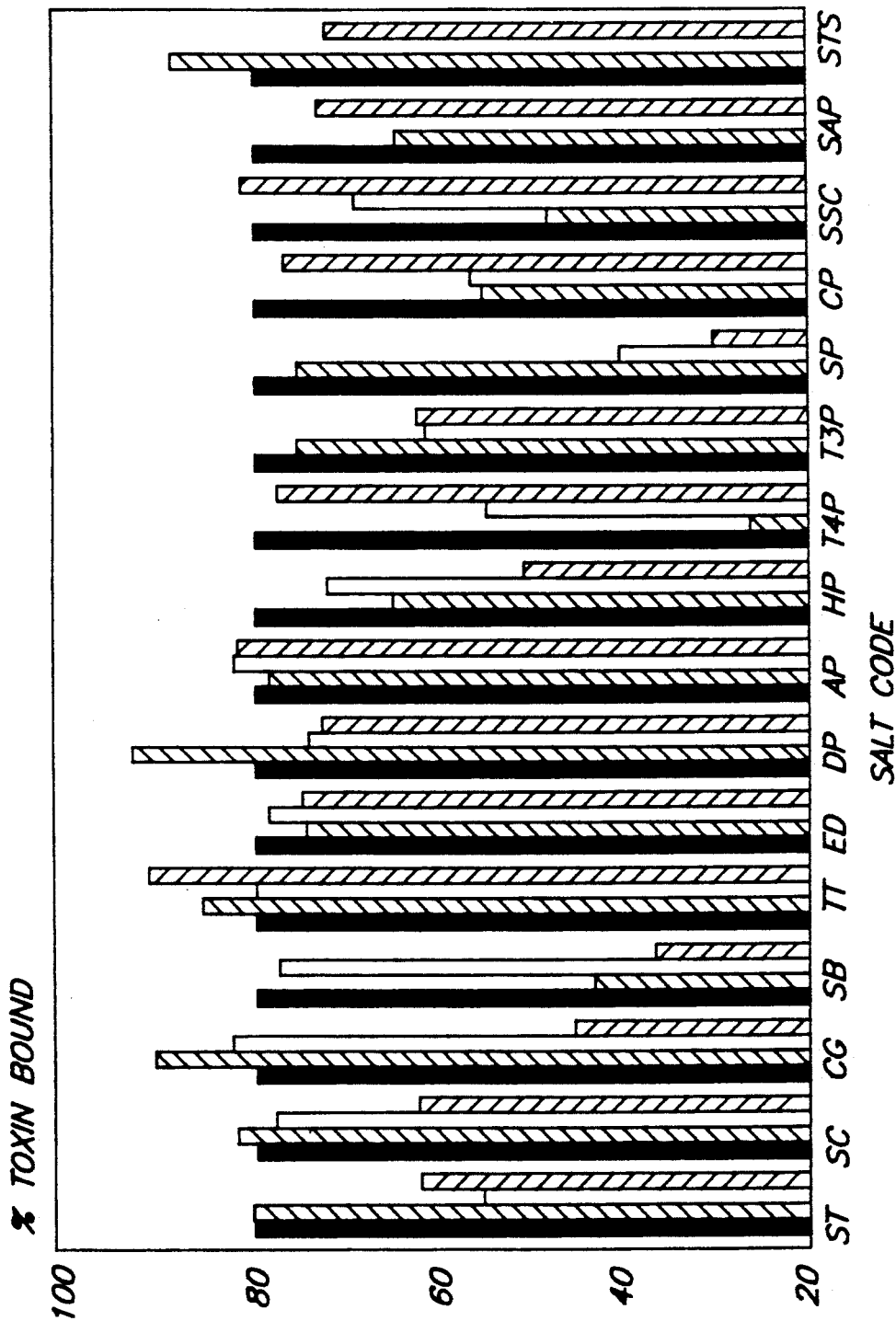
Figure 10:
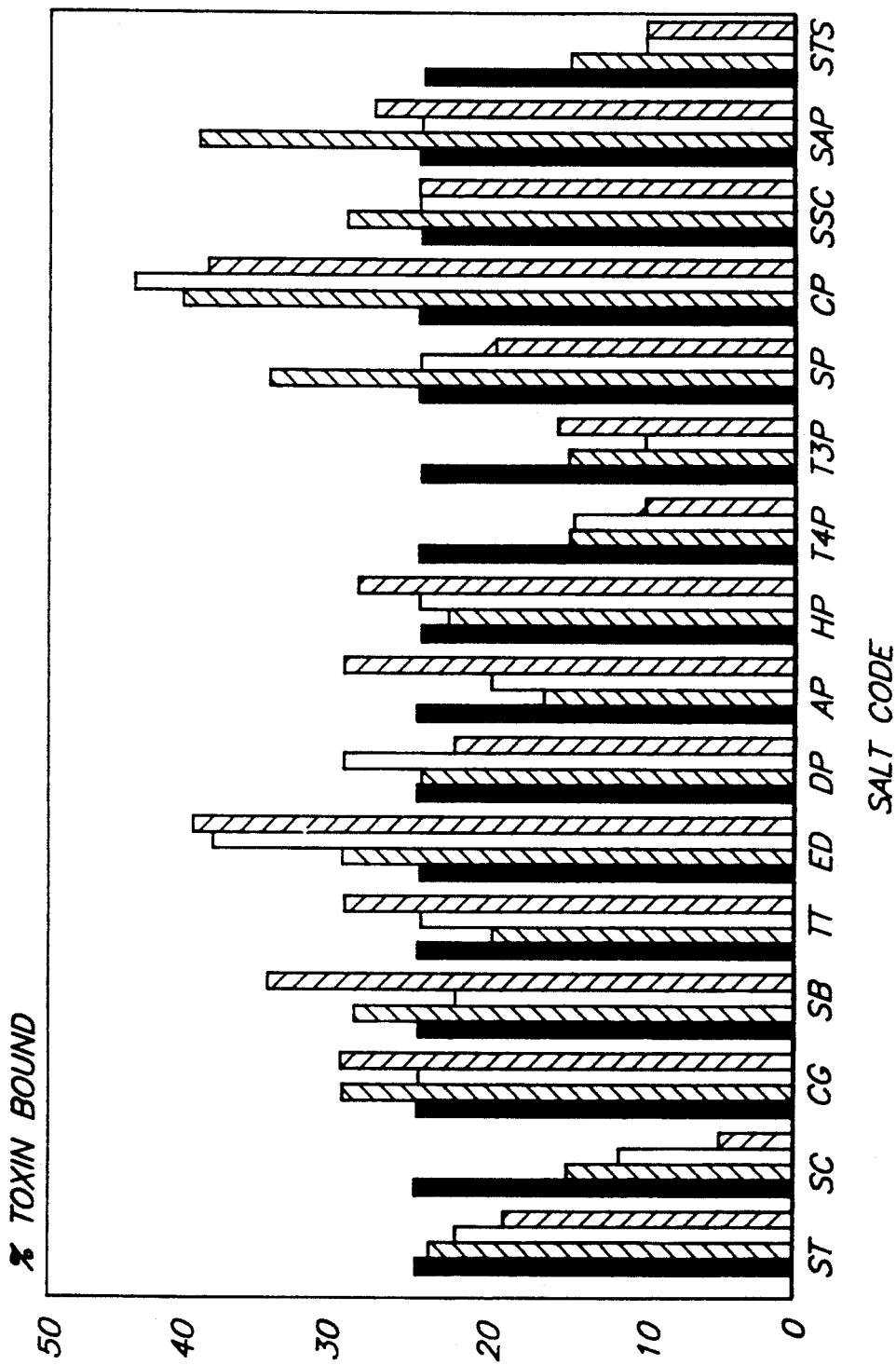

As shown in FIG. 2, practically all of the sequestrant salts utilized in clay/sequestrant formulations enhance the binding capacity for aflatoxin over the base clay (0% loading). The only exception is calcium phytate which seems not to improve binding capacity. Although the percentage salt loading required to achieve maximum enhancement in aflatoxin binding capacity varies from one salt to the next, most seem to reach a maximum before 10 wt % of salt is added. As mentioned above, surface area and pore volume for these formulations generally decrease with increasing salt loadings (see Table 3).

EXAMPLE III

The following in vitro tests were performed to demonstrate that the enhancement in aflatoxin B1 binding capacity that results when a variety of montmorillonite clays are treated with various levels of different (salt) sequestrants depends on complex interactions between the particular clay/sequestrant combination being utilized, as well as the level of the sequestrant being used. Samples were prepared as described in Example I and in vitro capacity tests were performed as described in Example II.

The data in Table 4 (see also FIG. 3) shows clearly that only one of the four source clays (Clay B) exhibits enhanced capacity for aflatoxin B1 when treated with sodium acid pyrophosphate (AP) at levels in the range 7-21 wt %. This shows that with some clays, the point of maximum enhancement in binding capacity is reached even before 7 wt % of the sequestrant salt has been added. This result is in essential agreement with the data presented in Example I. FIG. 4 shows what happens when another source clay (Clay A) is similarly treated with various other sequestrant salts.

This example, therefore, illustrates the fact that the optimum salt level for achieving maximum aflatoxin binding is not the same for all combinations of sorbents and salts. Thus, for instance, the disodium salt of EDTA and sodium citrate exhibit enhanced binding when 7 wt % salt levels are utilized, but two other salts, hexametaphosphate, and disodium phosphate apparently have already exceeded their optimum by the time 7 wt % levels are utilized. This suggests that optimum clay/-sequestrant combinations must be determined individually.

EXAMPLE IV

The following in vitro tests demonstrate that the desired enhancement in aflatoxin B1 binding capacity is optimum at around 4% salt loadings when montmorillonite clays are coated with different sequestrants. In addition, the data presented in this example indicate that certain types of montmorillonite, particularly those characterized by high di- and trivalent/monovalent exchangeable cation ratios, are most suitable for preparing enhanced capacity toxin sorbents by the methods of the instant invention described herein. Samples were prepared as described in Example I except that generally higher solids contents were employed (24–38 wt %) with the exception of Clay C where only 9% solids were employed. In vitro capacity tests were performed as described in Example II.

Table 5 lists the chemical and physical properties for the montmorillonite clays used in this series. As shown by the data in Table 6 (see also FIG. 5), those clays possessing relatively high (+2, +3/+1) exchange cation ratios (Clays A, B, D) are also the ones exhibiting enhanced aflatoxin binding capacity after treatment with relatively low levels of various sequestrant salts, regardless of whether that clay possesses a slurry pH on the acidic or basic side.

TABLE 4

EFFECT OF CLAY AND SALT TYPE
AFLATOXIN B1 BINDING ON CLAY/SALT COMPLEXES

| CLAY CODE | % AFB1 BOUND (1 MG SORBENT/40 uG TOXIN) SALT LOADING (WT %) 0% | 7% | 14% | 21% | SALT | SALT CODE | % AFB1 BOUND (10 MG SORBENT/40 uG TOXIN) SALT LOADING (WT %) 0% | 7% | 14% | 21% | SALT | SALT CODE |
|---|---|---|---|---|---|---|---|---|---|---|---|---|
| A | 69.5 | 73.7 | 66.4 | 65.0 | Di Na EDTA | ED | 94.9 | 95.0 | 92.5 | 91.7 | Di Na EDTA | ED |
| A | 69.5 | 74.6 | 62.4 | 60.1 | Na Citrate | SC | 94.9 | 93.4 | 87.8 | 88.2 | Na Citrate | SC |
| A | 69.5 | 60.1 | 69.3 | 61.7 | Na Hexametaphosphate | HP | 94.9 | 93.4 | 93.7 | 90.4 | Na Hexametaphosphate | HP |
| A | 69.5 | 57.0 | 53.0 | 41.4 | Di Na Phosphate | DP | 94.9 | 81.8 | 80.4 | 85.0 | Di Na Phosphate | DP |
| B | 89.3 | 95.8 | 92.2 | 93.8 | Na Acid Pyrophosphate | AP | | | | | | |
| C | 82.9 | 82.9 | 81.1 | 82.2 | " | AP | 95.2 | 97.2 | 96.6 | 95.1 | Na Acid Pyrophosphate | AP |
| D | 77.8 | 62.8 | 63.9 | 46.2 | " | AP | 97.7 | 95.2 | 94.7 | 92.1 | " | AP |
| E | 92.6 | 91.2 | 77.1 | 75.9 | " | AP | 96.3 | 93.9 | 95.9 | 94.6 | " | AP |

TABLE 5

| CHEMICAL AND PHYSICAL PROPERTIES OF SOURCE CLAYS | | | | | | | | | | | | | |
|---|---|---|---|---|---|---|---|---|---|---|---|---|---|
| | SA[1] | PV[1] | CEC[2] | pH | Viscosity[3] | CHEMICAL ANALYSIS (WT %) | | | | | | | |
| CODE | ($m^2/g$) | (cc/g) | (meq/100 g) | (slurry) | (cps) | $SiO_2$ | $Al_2O_3$ | $Fe_2O_3$ | MgO | CaO | $Na_2O$ | $K_2O$ |
| A | 67 | 0.11 | 104–112 | 7.95 | 357 @ 36% solids | 67.6 | 20.7 | 2.82 | 5.44 | 3.32 | 0.37 | 0.19 |
| B | 62 | 0.089 | 84–100 | 8.75 | 375 @ 38% solids | 67.1 | 19.4 | 5.87 | 3.85 | 3.10 | 0.30 | 0.44 |
| C | 30 | 0.064 | 111 | 9.68 | 1420 @ 9% solids | 63.5 | 21.1 | 5.08 | 3.41 | 4.10 | 2.12 | 0.70 |
| D | 52 | 0.10 | 80 | 5.51 | 354 @ 38% solids | 67.2 | 22.1 | 3.80 | 4.16 | 1.27 | 0.32 | 1.16 |
| E | 39 | 0.078 | — | 5.10 | 323 @ 24% solids | 70.7 | 20.0 | 1.19 | 4.67 | 2.29 | 0.66 | 0.51 |

[1]Surface area (BET method) and pore volumes (BJH method) were measured simultaneously with a Micromeritics ASAP 2400.
[2]Cation exchange capacity
[3]Measured with Brookfield viscometer (#3 spindle except sample C, #6 spindle).

| | | EXCHANGEABLE CATIONS (meq/100 g) | | | | | EXCHANGE CATION RATIO |
|---|---|---|---|---|---|---|---|
| CODE | CLAY TYPE | $Ca^{+2}$ | $Mg^{+2}$ | $Na^+$ | $K^+$ | $Al + Fe^{+3}$ | (Divalent + trivalent/monovalent) |
| A | Ca-montmorillonite | 137.9 | 15.8 | 4.25 | .38 | — | 33.2 |
| B | Ca-montmorillonite | 115.4 | 19.2 | 5.18 | .94 | — | 22.0 |
| C | Na-montmorillonite | 58.0 | 10.0 | 41.7 | 2.01 | — | 1.56 |
| D | Ca/Al-montmorillonite | 25.7 | 10.2 | 5.74 | .32 | 45.4 | 13.4 |
| E | Ca/Na-montmorillonite | 57.1 | 20.2 | 11.2 | .41 | — | 6.67 |

In contrast, those clays exhibiting relatively low (+2, +3/+1) enchange cation ratios (Clays C, E) show little or no improvement in toxin binding capacity when treated with either of two different sequestrant salts. The latter two clays also generally possess lower surface areas and pore volumes than do the other clays which show enhancement in toxin binding capacity upon treatment with sequestrant salts.

TABLE 6

| PHYSICAL PROPERTIES/AFLATOXIN B1 BINDING CLAY/SALT COMPLEXES: EFFECT OF CLAY/SALT TYPE | | | | | | |
|---|---|---|---|---|---|---|
| CLAY CODE | SALT CODE | SALT LOADING (WT %) | SLURRY pH | LOSS ON IGNITION (WT %) | VISCOSITY (CPS) | % AFB1 BOUND |
| A | NONE | 0 | 7.5 | 2.6 | 357 | 79.5 |
| | DP | 1 | 7.3 | 3.8 | 712 | 84.0 |
| | | 2 | 7.7 | 4.3 | 1428 | 87.3 |
| | | 4 | | 2 | PASTE | 87.7 |
| | TP | 1 | 8.1 | 4.2 | 638 | 80.5 |
| | | 2 | 8.1 | 3.5 | 4 | 86.7 |
| | | 4 | | 4.5 | PASTE | 87.6 |
| | HP | 1 | 7.2 | 3 | 258 | 82.1 |
| | | 2 | 6.8 | 4.8 | 265 | 82.4 |
| | | 4 | 6.4 | 4.6 | 219 | 86.8 |
| B | NONE | 0 | 8.9 | 5.1 | 375 | 89.2 |
| | TP | 1 | 8.8 | 4.7 | 5 | 88.1 |
| | | 2 | 9.0 | 4.7 | 76 | 93.9 |
| | | 4 | 9.0 | 3.3 | 4480 | 94.7 |
| | TS | 1 | 9.6 | 5.1 | 26 | 88.6 |
| | | 2 | 9.7 | 4.2 | 2220 | 91.5 |
| | | 4 | | 6.4 | PASTE | 95.7 |
| | HP | 1 | 8.6 | 4.5 | 12 | 85.0 |
| | | 2 | 8.4 | 7.8 | 12 | 93.8 |
| | | 4 | 8.1 | 3.7 | 148 | 94.0 |
| | SC | 1 | 9.1 | 5.2 | 880 | 82.0 |
| | | 2 | 9.2 | 5.7 | 908 | 87.9 |
| | | 4 | 9.3 | 6.7 | 1316 | 93.0 |
| | ST | 1 | 8.7 | 4.6 | 300 | 86.4 |
| | | 2 | 8.6 | 4.7 | 408 | 90.0 |
| | | 4 | 8.6 | 3.4 | 378 | 94.5 |
| C | NONE | 0 | 9.6 | | 1420 | 84.0 |
| | TP | 1 | 9.6 | | 263 | 82.8 |
| | | 2 | 9.5 | | 183 | 72.1 |
| | | 4 | 9.6 | | 24 | 80.1 |
| | AP | 1 | 7.2 | | 9 | 84.5 |
| | | 2 | 6.5 | | 6 | 82.8 |
| | | 4 | 5.9 | | 3 | 84.7 |
| SOURCE CODE | SALT CODE | LOADING (WT %) | SLURRY pH | LOSS ON IGNITION (WT %) | VISCOSITY (CPS) | % AFB1 BOUND |
| D | NONE | 0 | 3.5 | 5.6 | 354 | 82.4 |
| | TP | 1 | 3.6 | 5 | 298 | 85.2 |
| | | 2 | 3.7 | 4.4 | 230 | 90.2 |
| | | 4 | 4.6 | 5.2 | 60 | 89.6 |
| | AP | 1 | 2.7 | 5.4 | 244 | 86.9 |
| | | 2 | 2.3 | 5.2 | 412 | 88.6 |
| | | 4 | 2.1 | 5.1 | 124 | 87.0 |
| E | NONE | 0 | 5.1 | 2.7 | 323 | 92.4 |
| | AP | 1 | 4.7 | 2.3 | TOO THIN | 91.8 |
| | | 2 | 4.5 | 2.7 | 4 | 93.2 |

TABLE 6-continued
PHYSICAL PROPERTIES/AFLATOXIN B1 BINDING
CLAY/SALT COMPLEXES: EFFECT OF CLAY/SALT TYPE

|    |    | 4 | 4.4 | 2.5 | 18    | 92.8 |
|----|----|---|-----|-----|-------|------|
| TP |    | 1 | 6.8 | 3   | 8     | 93.1 |
|    |    | 2 | 6.8 | 4   | 1590  | 92.8 |
|    |    | 4 |     | 3.1 | PASTE | 93.0 |

Salt code: TP = sodium tripolyphosphate; TS = tetrasodium pyrophosphate; AP = sodium acid pyrophosphate
HP = sodium hexametaphosphate; SC = sodium citrate; ST = sodium thiosulfate; DP = disodium phosphate.

EXAMPLE V

The following in vivo tests were performed to illustrate the improvement in binding of aflatoxin that occurs when a formulation of Clay B and 4% sodium acid pyrophosphate is employed in a living system as compared to using untreated base clay (CLAY B). In these experiments, 1 week old Arbor Acres X Peterson broiler chickens were wing banded and randomly placed in Petersime battery cages, 25/pen, 2 pens/group, except for group 1 which contained only 10 birds. They were provided brooding heaters at 95° F.±5° F., water and feed ad libitum. On day 7 the brooder heaters were turned down to 90° F.±5° F. On day 10 the birds were transferred to a Petersime growing battery according to a randomization schedule. Ten birds were placed in each pen and maintained on their appropriate diets. Each group of 10 birds represented a sampling period. Ambient temperatures were then maintained at 85° F.±5° F. Trough type feeders and waterers were used.

DOSING: Between days 13 to 14 (24 hour period) feed consumption was determined per pen of chicks. Based on this feed consumption value, the total amount of $^{14}C$ aflatoxin B1 ($^{14}C$ AFB1) and aflatoxin B1 (AFB1) to be given to the birds was determined. The calculated amount of $^{14}C$ AFB1 and AFB1 and approximately 0.15 gms of feed (either treated with base clay, base clay/4% sodium acid pyrophosphate[4%], or nontreated, depending on the group) was placed in a small gelatin capsule, capable of dissolving in the crop, and passed to the level of the esophagus in each chicken. After dosing, the birds were placed back into their pens and offered their appropriate diets.

SAMPLING: Sample times for each group of birds was ½ hour, 1 hours, 2 hours, 4 hours and 6 hours. Liver and blood samples were obtained at these sampling times. The liver samples were immediately frozen at −20° C. Blood was drawn into 10 ml heparinized vacutainer tubes and immediately refrigerated (maximum of 6 hours) until centrifuged and the plasma removed and frozen at −20° C.

ASSAY: The samples were assayed for levels of $^{14}C$ AFB1 by taking subsamples of individual livers (1.0 gm) which were homogenized in 3X volumes of distilled water and 5 mls of chloroform-methanol (2:1) using a high speed blender. The chloroform-methanol layer was removed and placed in a clear glass scintillation vial containing 15 mls of Aqualyte Plus (J. T. Baker) scintillation cocktail. One ml of plasma was added to 19 mls of the scintillation cocktail. Counting of the samples was done on a Beckman LS 7000 Scintillation counter. Each vial was counted over a period of 5 minutes with an external standard quench correction. Counting efficiency was determined by using the $^{14}C$ AFB1 standard. Background counts were subtracted from the total counts before dividing by the sample size and correcting for counting efficiency.

FEED MIXING: A standard corn-soy starter ration was used. The feed was mixed in a 100 kg capacity horizontal paddle mixer. Additives were combined with feed at levels sufficient to produce mixed feeds containing either 0.1% or 0.5% (dry wt basis) additives in the feed. Feeds were mixed for 10 minutes. The nontreated feed consisted of the basal ration.

$^{14}C$ AFB1 PREPARATION: $^{14}C$ AFB1 was obtained from Moravek Biochemical, Brea, CA. The specific activity of the $^{14}C$ AFB1 was 100-200 µCi/mmole. AFB1 was obtained from Sigma Chemicals.

DATA ANALYSIS: The amount of $^{14}C$ AFB1 in the liver and plasma was compared between the birds treated at the 0.1% additive level (20 and 80 ppb $^{14}C$ AFB1) and 0.5% additive level (20 and 80 ppb $^{14}C$ AFB1) versus the nontreated birds (20 and 80 ppb $^{14}C$ AFB1). The pharmacokinetic parameters of rate of adsorption, rate of elimination and area-under-the-curve were computed for liver and plasma using the curve fitting program ESTRIP (Brown and Manno, *J. of Pharmaceutical Sci.*, 1978, Vol. 67, 1687-1691). Analysis of variance was performed on the $^{14}C$ AFB1 content of the liver and plasma at each time point and the pharmacokinetic parameters determined with ESTRIP. Differences among the treatments was determined using Tukey's lsd test. The probability of a type 1 error was set at the nominal 5% level.

RESULTS: FIGS. 6A, 6B and 7A, 7B which were derived from the data in Table 7 illustrate graphically what happens to the amount of $^{14}C$ AFB1 detected in blood plasma and liver tissue versus time, respectively when chicks were fed two levels of radiolabeled aflatoxin in diets containing two different levels of base clay or base clay plus sequestrant. For both blood plasma and liver tissue, aflatoxin levels peak during the first hour after exposure and then gradually drop off with time. Clearly, diets containing either base clay, or those containing base clay plus sequestrant provide protection against exposure to aflatoxin as evidenced by the fact that significantly lower levels of aflatoxin are detected in blood plasma and liver tissues as compared to the levels detected in control groups (i.e. those where feed plus aflatoxin are present, but no additive; see Table 7).

TABLE 7
IN VIVO BINDING OF C14-RADIOLABELED AFLATOXIN VS TIME
BROILERS: ARBOR ACRES × PETERSON

| AFB1 (PPB) | CLAY (WT %) | LIVER DATA: CLAY B TIME-HRS (% RADIOLABEL VS CONTROL) | | | | | BLOOD DATA: CLAY B TIME-HRS (% RADIOLABEL VS CONTROL) | | | |
|---|---|---|---|---|---|---|---|---|---|---|
|   |   | 0.5 | 1 | 2 | 4 | 6 | 0.5 | 1 | 4 | 6 |

TABLE 7-continued

IN VIVO BINDING OF C14-RADIOLABELED AFLATOXIN VS TIME
BROILERS: ARBOR ACRES × PETERSON

| 20 | 0   | 97 | 100 | 93 | 78 | 65  | 48  | 100 | 31  | 21  |
|----|-----|----|-----|----|----|-----|-----|-----|-----|-----|
| 80 | 0   | 90 | 100 | 91 | 66 | 56  | 48  | 100 | 28  | 19  |
| 20 | 0.1 | 40 | 32  | 30 | 33 | 25  | 8.5 | 23  | 10  | 5.5 |
| 80 | 0.1 | 23 | 18  | 17 | 20 | 16  | 4.0 | 18  | 12  | 4   |
| 20 | 0.5 | 22 | 21  | 18 | 15 | 12  | 2.5 | 10  | 5.8 | 1.7 |
| 80 | 0.5 | 16 | 14  | 13 | 13 | 8.5 | 1.5 | 9.7 | 2.1 | 0.6 |

| AFB1 (PPB) | CLAY (WT %) | LIVER DATA: CLAY B + 4% AP* TIME-HRS (% RADIOLABEL VS CONTROL) | | | | | BLOOD DATA: CLAY B + 4% AP* TIME-HRS (% RADIOLABEL VS CONTROL) | | | | |
|---|---|---|---|---|---|---|---|---|---|---|---|
| | | 0.5 | 1 | 2 | 4 | 6 | 0.5 | 1 | 2 | 4 | 6 |
| 20 | 0   | 67  | 100 | 88  | 64  | 39  | 55  | 100 | 59  | 59  | 16  |
| 80 | 0   | 72  | 100 | 78  | 62  | 44  | 61  | 100 | 49  | 37  | 14  |
| 20 | 0.1 | 4.7 | 7.0 | 6.4 | 3.0 | 1.1 | 2.4 | 13  | 3.1 | 2.9 | 1.3 |
| 80 | 0.1 | 6.1 | 8.7 | 6.7 | 3.0 | 1.2 | 4.5 | 11  | 3.2 | 2.3 | 1.3 |
| 20 | 0.5 | 0.9 | 2.3 | 1.3 | 0.8 | 0.8 | 0.8 | 3.1 | 2.3 | 1.6 | 1.4 |
| 80 | 0.5 | 3.0 | 2.8 | 1.6 | 1.0 | 0.6 | 0.6 | 5.4 | 2.1 | 1.4 | 0.9 |

*Sodium Acid Pyrophosphate

However, as is also apparent, the diets treated with base clay plus sequestrant are significantly better at reducing aflatoxin detected in blood plasma (by a factor of 2 to 4X) and liver tissues (by a factor of 2 to 8X) at the 1 hr peak time as compared to diets containing only base clay (without sequestrant). This experiment, then, provides in vivo verification of the enhancement in aflatoxin binding capacity afforded by treating a susceptible montmorillonite clay with a typical sequestrant salt used in food processing.

EXAMPLE VI

The following in vitro tests were performed to demonstrate that other mycotoxins besides aflatoxin exhibit enhanced binding when exposed to appropriate clay/sequestrant formulations. In this set of experiments, five other commercially significant mycotoxins were examined: deoxynivalenol, zearalenone, ochratoxin A, citrinin and T-2 toxin. The clay/sequestrant samples used in these experiments were the same ones as used in Example II.

The following modifications to the in vitro capacity test described in Example II were utilized in the extraction and analysis of these toxins:

Extraction Procedures

1) For zearalenone, the extraction procedure was the same as for aflatoxin B1.
2) For ochratoxin A and citrinin, the aqueous phase was acidified with 5 drops of 10% aqueous HCl and then extracted twice with 3 ml portions of dichloromethane. The organic extracts were combined and evaporated to dryness under nitrogen prior to analysis.
3) For T-2 and deoxynivalenol, the aqueous phase was saturated with sodium chloride and then extracted three times with 3 ml portions of ethyl acetate. The organic extracts were combined and evaporated to dryness under nitrogen prior to analysis.

Analysis Procedures

1) For ochratoxin A and citrinin, the analysis procedure was the same as for aflatoxin B1.
2) For T-2, deoxynivalenol and zearalenone, the residue from the extraction of the aqueous phase was dissolved in 40 μl of ethyl acetate. One (1) μl of this solution was added by on-column injection onto a 12 m cross-linked methyl silicon capillary column (0.2 mm I.D. with 33 micron film thickness). Initial temperature was held at 40° C. for 1 min and then ramped at 40°/min to a final temperature of 270° C. Peaks were quantitated by computer comparison of integration values for the total ion chromatograms of individual sample runs with known standards which were subjected to the same chromatographic conditions. Standards were routinely analyzed to ensure that the sensitivity of the GC/MS did not significantly change during the experiment. Due to the extensive time requirements for GC/MS analysis, TLC analysis for zearalenone was found to be advantageous.

Binding experiments were run at two different sorbent levels: 100 mg and 10 mg sorbent/40 μg toxin. FIGS. 8-11 are bar graphs showing the results obtained when 100 mg of the various clay/sequestrant formulations were used to bind 40 μg of deoxynivalenol, zearalenone, ochratoxin A and citrinin, respectively. With the exception of zearalenone, binding of other toxins was low (i.e. <10%) when using only 10 mg of sorbent; therefore only the results obtained at the 100 mg level were graphed. T-2 toxin binding results were not graphed because it was determined that transformation into diol and triol derivatives (which were subsequently desorbed) was at least partially responsible for its (apparent) reduction by binding.

Figure 12:
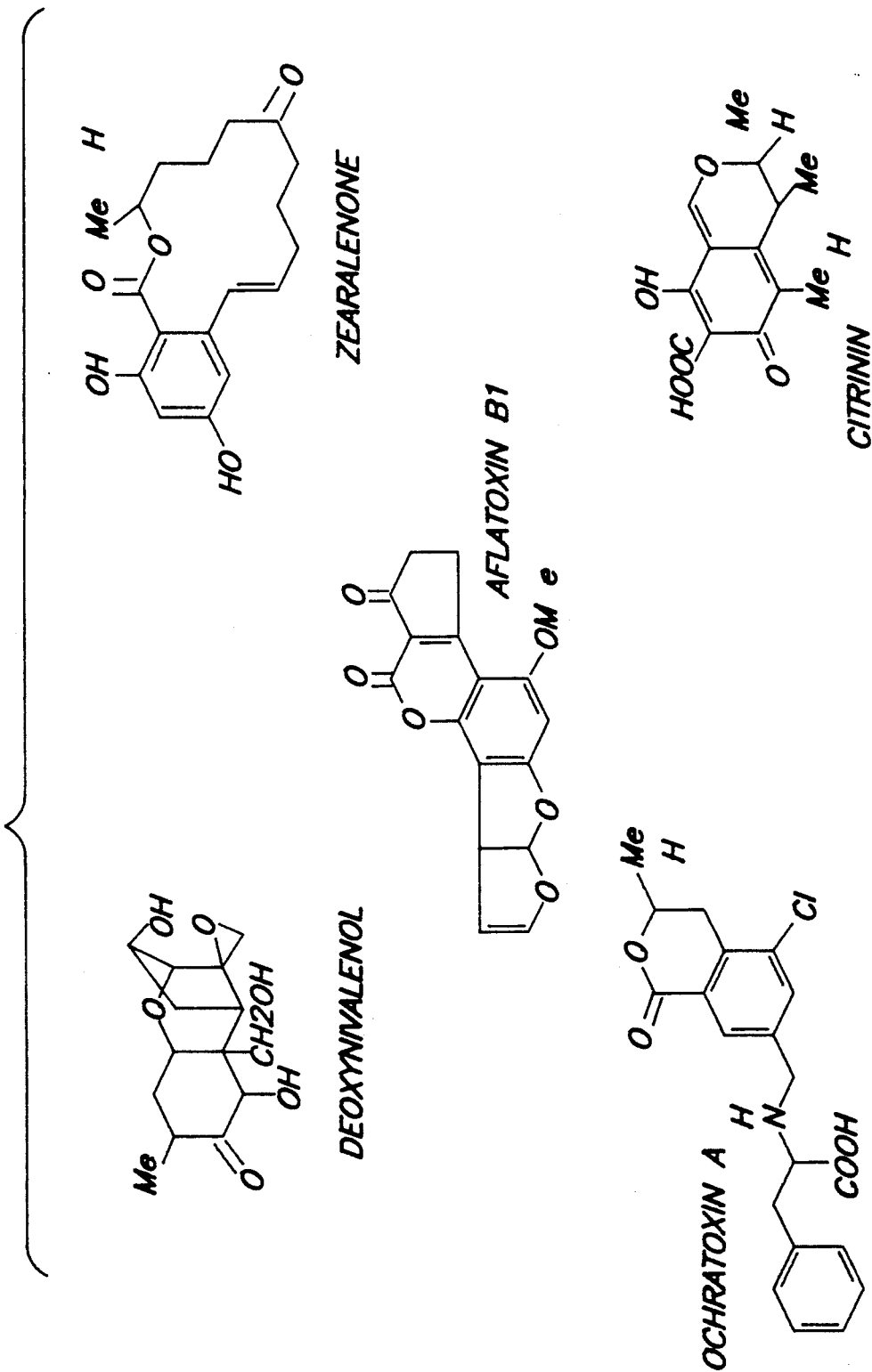
FIG. 12. Structural formulas for some common mycotoxins.

Nevertheless, as is clear from the figures, each of the other toxins exhibit enhancement of binding in the presence of some combination(s) of clay/sequestrant. That not all or the same clay/sequestrant combinations are effective in this regard is believed to be a consequence of not having determined the optimum clay/sequestrant ratio for that particular toxin and sequestrant (e.g. -see Example III). Also, it must be kept in mind that the chemical structures (and consequently, reactivities) for these toxins are quite varied (see FIG. 12). On this basis, it is not surprising that the optimum clay/sequestrant ratio for promoting enhanced binding of a particular mycotoxin would not necessarily be the optimum for another.

EXAMPLE VII

The following in vitro test was performed to demonstrate that sequestrants enhanced the effectiveness of sorbent materials other than montmorillonites in binding a mycotoxin. In this experiment, aflatoxin bonding to phosphate treated (and untreated) pseudoboehmite alumina (a high surface area, partially crystalline oxyhydroxide of alumina) and pyrophylite (a 2:1 phyllosilicate possessing a structure identical to montmorillonite but devoid of interlayer cations) were compared to a Ca-montmorillonite obtained in Arizona. The phosphate salt used in these experiments was sodium acid pyrophosphate.

Procedure

A solution of sodium acid pyrophosphate was prepared by adding 50 mg of the salt to water and adjusting to 250 ml in a volumetric flask. An aflatoxin solution was prepared by adding 1 mg of aflatoxin B1 to 1 ml of methanol (reagent grade). 1 ml of the phosphate solution was then added to 100 mg of the sorbent materials described above in a test tube and incubated for 1 hr at 37° C. in a water bath. Then 20 μl of the B1 solution was added to the material in the test tube and incubated for 2 hrs at 37° C. In the case of the controls (without phosphate), the same procedures were used, but pure water was used in place of the phosphate solution.

After extraction as per Example II, the residue was dissolved in 100 μl of chloroform. 2 μl of this solution was spotted on a 10×10 cm Analtech HPTLC-HLF silica gel plate (lot 20888). The plate was developed with a chloroform/acetone solution (9/1, v/v) and quantitation was made by visual comparison of fluorescence (365 nm) with known standards of aflatoxins B1, B2, and G1 spotted on the same plate.

Results, reported in Table 8, show that the addition of phosphate salt enhances adsorption of aflatoxin B1, regardless of the sorbent type employed. Significantly, when the phosphate salt is present, it also inhibits the formation of related species of aflatoxin (i.e. -B2, G1) from B1 as, for example, when alumina and pyrophylite are the sorbents.

These results show that the use of sequestrants such as sodium acid pyrophosphate with various sorbent materials to enhance the binding of aflatoxin is a general phenomenon and not restricted to a narrow class of clay minerals (i.e. -montmorillonites).

TABLE 8

EFFECT OF ADDING Na ACID PYROPHOSPHATE: AFLATOXIN BINDING ON OTHER SORBENTS

| SORBENT | TREATED + = YES | WT. AFLATOXINS EXTRACTED FROM SORBENT (ng) B1 | B2 | G1 |
|---|---|---|---|---|
| Alumina | + | 37 | 0 | 0 |
| Alumina | − | 380 | 10 | 0 |
| Pyrophyllite | + | 410 | 0 | 0 |
| Pyrophyllite | − | 650 | 37 | 12 |
| Montmorillonite | + | 0 | 0 | 0 |
| Montmorillonite | − | 230 | 0 | 0 |

We claim:

1. A dry solid particulate animal feed additive for use with dry biodegradable animal feed, said additive consisting essentially of particles of a phyllosilicate mineral capable of inactivating mycotoxins, said particles being coated with a water-soluble sequestering agent in an amount sufficient to enhance the mycotoxin inactivating capacity of said particles of phyllosilicate mineral.

2. The feed additive of claim 1 wherein said sequestering agent is one that is capable of dispersing said particles of phyllosilicate mineral and is present in amount in excess of that required to disperse said particles of phyllosilicate mineral in water.

3. The feed additive of claim 2 wherein said sequestering agent is a phosphate or citrate salt.

4. The feed additive of claim 1 wherein said phyllosilicate is a high calcium/low sodium montmorillonite clay and said sequestering agent is present in amount in the range of about 2 to 10% based on the weight of said clay.

5. The feed additive of claim 4 wherein said montmorillonite has exchangeable cations whose divalent plus trivalent/monovalent cation ratio is greater than 7.

6. The feed additive of claim 4 wherein said montmorillonite has a surface area in the range of about 40 to 80 $m^2/gm$ and a total pore volume in the range of about 0.1 to 0.3 cc/gm.

7. The feed additive of claim 1 wherein said sequestering agent is selected from the group consisting of sodium, calcium and potassium acetates; sodium, calcium and potassium citrates; and free acid and monoisopropyl, monoglyceride stearyl and triethyl derivatives thereof; disodium dihydrogen and disodium calcium salts of ethylenediaminetetraacetic acid; calcium and sodium gluconates; oxystearin; monocalcium acid orthophosphate; dibasic potassium orthophosphate; sodium aluminum orthophosphate; dibasic sodium orthophosphate; monobasic sodium orthophosphate; tribasic sodium orthophosphate; calcium and sodium hexametaphosphate; tetrasodium and sodium pyrophosphate; sodium tripolyphosphate; calcium phytate; sodium and sodium potassium tartrates and the free acid thereof; sodium thiosulfate; and mixtures of the aforementioned.

8. The feed additive of claim 1 wherein said phyllosillcate is coated by spray drying an aqueous slurry of phyllosillcate and sequestrant.

9. The feed additive of claim 1 wherein said phyllosillcate is coated by mixing an aqueous slurry of phyllosillcate with sequestrant and then drying and pulverizing the mixture.

10. A dry solid animal feed composition in which biodegradable feed is contaminated with a mycotoxin, said feed composition being admixed with a mycotoxin inactivating agent consisting essentially of particles of a phyllosilicate mineral capable of inactivating mycotoxins, said particles of phyllosilicate mineral being coated with a sequestering agent in an amount sufficient to enhance the mycotoxin inactivating capacity of said phyllosillicate.

11. The composition of claim 10 wherein said phyllosillcate is a calcium montmorillonite.

12. The composition of claim 10 wherein said calcium montmorillonite has exchangeable cations whose divalent plus trivalent/monovalent cation ratio is greater than 7.

13. The composition of claim 12 wherein said montmorillonite has a surface area in the range of about 40 to 80 $m^2/gm$ and a total pore volume in the range of about 0.1 to 0.3 cc/gm.

14. The composition of claim 10 wherein said sequestering agent is selected from the group consisting of sodium, calcium and potassium acetates; sodium, calcium and potassium citrates; and free acid and monoisopropyl, monoglyceride stearyl and triethyl derivatives thereof; disodium dihydrogen and disodium calcium salts of ethylenediaminetetraacetic acid; calcium and sodium gluconates; oxystearin; monocalcium acid orthophosphate; dibasic potassium orthophosphate; sodium aluminum orthophosphate; dibasic sodium orthophosphate; monobasic sodium orthophosphate; tribasic sodium orthophosphate; calcium and sodium hexametaphosphate; tetrasodium and sodium pyrophosphate; sodium tripolyphosphate; calcium phytate; sodium and sodium potassium tartrates and the free acid thereof; sodium thiosulfate; and mixtures of the aforementioned.

15. The composition of claim 10 wherein said coated phyllosilicate is present in an amount in the range of about 0.025 to 1.5% by weight of the animal feed.

16. The feed composition of claim 10 wherein said animal feed is poultry, swine or dairy feed.

17. The composition of claim 10 wherein said mycotoxin is aflatoxin.

18. The composition of claim 10 wherein said mycotoxin is aflatoxin, said phyllosilicate is a high calcium/low sodium montmorillonite clay and said sequestrant is a phosphate or citrate salt present in an amount of about 2 to 10% based on the weight of said calcium montmorillonite.

19. The composition of claim 18 wherein said phosphate salt is a condensed phosphate.

20. The composition of claim 19 wherein said condensed phosphate salt is sodium acid pyrophosphate.

21. The composition of claim 19 wherein said condensed phosphate salt is sodium acid hexametaphosphate.

22. The composition of claim 19 wherein said condensed phosphate salt is tetrasodium pyrophosphate.

23. The composition of claim 10 wherein said sequenstrant is sodium citrate.

24. A dry solid animal feed composition consisting essentially of biogradable feed, said feed being contaminated with a mycotoxin selected from a group consisting of aflatoxin B1, deoxynivalenol, zearalenone, ochratoxin A, citrinin or T-2 toxin, said contaminated feed being admixed with from about 0.025 to 1.5% by weight of a high calcium/low sodium bentonite clay that is coated with from 2 to 10% by weight of a sequestrant, said coating enhancing the mycotoxin inactivating capacity of said clay.

25. The composition of claim 24 wherein said feed is a dry poultry, swine or dairy feed.

* * * * *